United States Patent
Cross

[11] Patent Number: 5,203,237
[45] Date of Patent: Apr. 20, 1993

[54] NOTCHED BLADE FOR ROTARY WIRE STRIPPER

[75] Inventor: Dan A. Cross, Seattle, Wash.

[73] Assignee: The Boeing Company, Seattle, Wash.

[21] Appl. No.: 654,400

[22] Filed: Feb. 8, 1991

Related U.S. Application Data

[63] Continuation of Ser. No. 446,181, Dec. 5, 1989, abandoned.

[51] Int. Cl.$^5$ .............................................. H02G 1/12
[52] U.S. Cl. ...................................... 81/9.51; 81/9.4; 30/351; 30/357
[58] Field of Search .................... 81/9.51, 9.4–9.44; 30/90.1–90.9, 91.1, 91.2, 346, 351, 353, 355, 357

[56] References Cited

U.S. PATENT DOCUMENTS

| | | | |
|---|---|---|---|
| 669,556 | 3/1901 | Spring | 81/9.4 |
| 1,131,473 | 3/1915 | Courtney | 81/9.4 |
| 2,645,959 | 7/1953 | Fuchs et al. | 81/9.51 |
| 2,671,363 | 3/1954 | Wells | 81/9.51 |
| 3,208,271 | 9/1965 | Thompson | 73/81 |
| 3,541,654 | 11/1970 | Hills | 81/9.51 |
| 3,564,952 | 2/1971 | Metcalf | 81/9.42 |
| 3,645,156 | 2/1972 | Meyer et al. | 83/9 |
| 3,881,374 | 5/1975 | Gudmestad | 81/9.51 |
| 4,185,522 | 1/1980 | Reinertz et al. | 81/9.51 |
| 4,327,609 | 5/1982 | Resch | 81/9.51 |
| 4,478,110 | 10/1984 | Undin et al. | 81/9.51 |
| 4,745,828 | 5/1988 | Stepan | 81/9.51 |

*Primary Examiner*—D. S. Meislin
*Attorney, Agent, or Firm*—Bruce A. Kaser; Joan H. Pauly

[57] ABSTRACT

The invention is an improved cutting blade for use in connection with a rotary wire stripper. The blade is notched in a manner so as to define one or more chipping points along the blade's edge. The notches are interconnected by sharp sections of the blade's edge. This configuration permits cutting through both hard and soft forms of wiring insulation. If the insulation is hard, the corners provided by the notches chip through it. If the insulation is soft, the sharp edges cut through it in conventional fashion.

4 Claims, 3 Drawing Sheets

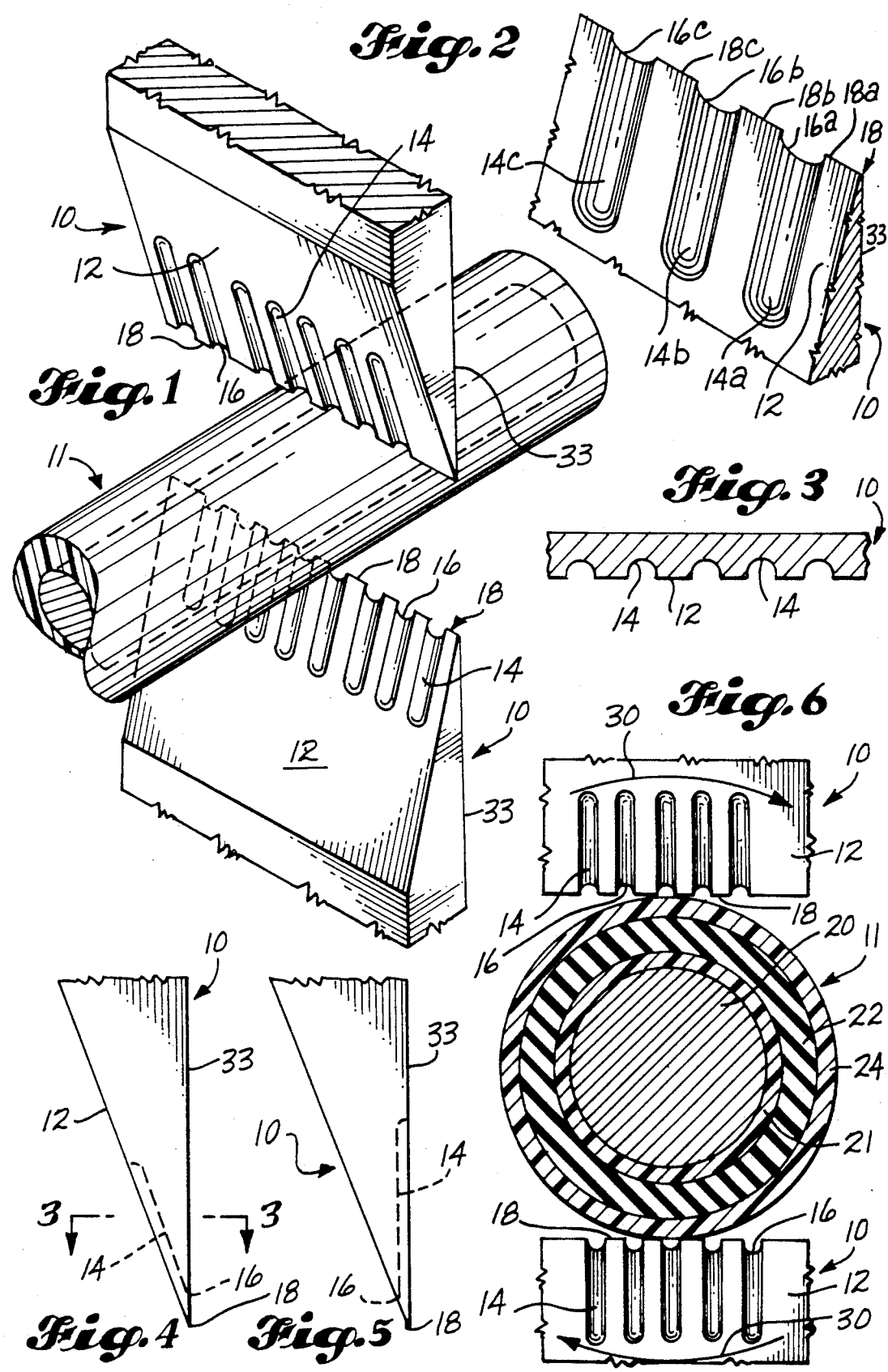

NOTCHED BLADE FOR ROTARY WIRE STRIPPER

This is a continuation of copending application Ser. No. 07/446,181 filed on Dec. 5, 1989, now abandoned.

TECHNICAL FIELD

This invention relates in general to wire stripping machines, and more particularly, to rotary wire strippers having blades driven in rotation that move radially inwardly for cutting the insulation from the end of a wire that is to be stripped.

RELATED APPLICATIONS

The invention is related to co-pending application Ser. Nos. 07/521,445 and 07/441,178 (now issued as U.S. Pat. No. 4,951,530), which are respectively entitled, "Conductor Proximity Sensor for Rotary Wire Stripper" and "Improved Wire Guide for Rotary Wire Stripper.

BACKGROUND ART

Similar to the related applications identified above, the invention disclosed here is designed to be used in conjunction with a rotary wire stripper of a type disclosed in U.S. Pat. No. 4,745,828, issued to Stepan, on May 24, 1988 (hereafter the '828 stripper). The '828 stripper is an excellent machine for stripping co-axial cables and other conductors where the wire's insulation is normally soft and thick. However, it is not particularly well-suited for cutting and stripping wires that are covered by one or more layers of thin, hard insulation.

For example, The Boeing Company, a well-known aircraft manufacturer, who is also the assignee of the invention disclosed here, uses one type of insulated wire having a center conductor that is covered by both an outer layer of soft insulation, and an intermediate layer of hard insulation. The hard insulation is typically very thin and glass-like in its hardness. Kapton (registered trademark) or multiple layers of fiberglass are typical materials used for this purpose.

Boeing uses other types of wires where the center conductor is first covered by a thin, very hard layer of Kapton (trademark), followed by an intermediate thick layer of soft insulation, and a thin outer sheath of fiberglass. Still another type involves a center conductor covered by a single thin layer of hard insulation with no intermediate layers.

The conventional blades used in conjunction with the '828 stripper cannot adequately strip the kinds of wires described above. A person having familiarity with the '828 stripper would know that it has diametrically opposed blades that circle and advance radially inwardly until the blades' edges cut through the insulation of the wire to be stripped. To be successful, the blades must cut the insulation as they are advanced inwardly, in order to prevent an accumulation of excess pressure between the blades and the wire's insulation. When the conventional blade encounters the type of hard, glass-like insulation described above, it cannot out through it as the blade advances. Instead, blade pressure on the insulation accumulates until the insulation is suddenly cracked in a crushing action. The uncontrolled pressure release created by this results in a poor stripping operation, especially when the wire's center conductor immediately underlies the layer of hard insulation. The sudden pressure release causes the blades to advance too far inwardly, thereby coming into contact with and nicking the center conductor.

Generally, and as a person skilled in the art would know, the wire's center conductor often consists of a plurality of small strands of copper twisted or braided together. Each strand is plated with a protective coating. Nicking one or more strands of the conductor removes this coating and creates a potential for long-term corrosion. Although this is usually not a problem that needs to be addressed in many manufactured products, it is a practical problem that cannot be ignored in aircraft manufacturing.

The invention disclosed here is designed to improve a rotary wire stripper, like the '828 stripper, so that it can be adapted to cut hard, thin layers of insulation without nicking the wire's conductor. As will become apparent, the invention is an improved blade design where the same blade is capable of cutting through and stripping both hard and soft insulation.

SUMMARY OF THE INVENTION

As just mentioned, the invention disclosed here is an improved blade that is designed to be used in connection with a rotary wire stripper such as, by way of nonlimiting example, the kind of stripper disclosed in U.S. Pat. No. 4,745,828. Strippers of this type are characterized in that they have a pair of diametrically opposed blades rotationally driven in a manner so that their cutting edges circle about the end of an insulated wire that is to be stripped. As this happens, the blades simultaneously move or advance radially inwardly, in a symmetrical manner from opposite sides of the wire, until their cutting edges contact and cut through the wire's insulation.

A blade in accordance with the invention has a cutting edge adapted for cutting either hard or soft forms of insulation. The blade's edge includes a portion shaped to define a chipping point that is particularly well-suited for chipping around and through hard insulation as the edge moves radially into contact with this particular type of insulation.

Such chipping point is defined by a notch and a sharp section or portion of the edge immediately adjacent the notch. More specifically, the sharp section is on that side of the notch which is rearward of the notch's rotational path of travel, and defines a corner on that particular side of the notch.

The notch is sufficiently wide so that a portion of the curved outer surface of the wire's insulation will normally be received within the notch as the blade circles and advances into contact with the insulation. This permits the corner to function as the chipping point.

The notch is an unsharpened surface. It may be created in the blade's edge by scribing a groove along the blade, perpendicular to the blade's edge, which knocks out the notch when the scribe reaches the edge. If a single notch is used in the blade, it is preferably positioned so that it will be centered with respect to the centerline axis of the wire's center conductor while the blade is used in a cutting and stripping operation. It is more preferable, however, that a plurality of notches be distributed along the blade's edge, each being interconnected by sharp sections of the blade. This, in effect, creates numerous chipping corners along the blade's edge so that the wire need not be exactly centered relative to the blade to receive its chipping action.

The invention as summarized above will become better understood upon consideration of the following description which is to be taken in conjunction with the drawings.

BRIEF DESCRIPTION OF THE DRAWINGS

In the drawings, like reference numerals refer to like parts throughout the various views, except where otherwise indicated, and wherein:

FIG. 1 is a pictorial view showing fragmentary portions of two blades in accordance with the invention approaching a wire from opposite sides for cutting through its insulation;

FIG. 2 is an enlarged fragmentary view of an edge portion of one of the blades shown in FIG. 1;

FIG. 3 is a fragmentary cross-sectional view of the edge portion shown in FIG. 2, and is taken along line 3—3 in FIG. 4;

FIG. 4 is a fragmentary side view of the edge portion shown in FIG. 2;

FIG. 5 is a view like FIG. 4, but illustrates the location of a scribed groove on the non-beveled side of the blade;

FIG. 6 is a view like FIG. 1, but is sectioned through one type of wire that is to be cut and stripped;

BEST MODE FOR CARRYING OUT THE INVENTION

Figure 7:
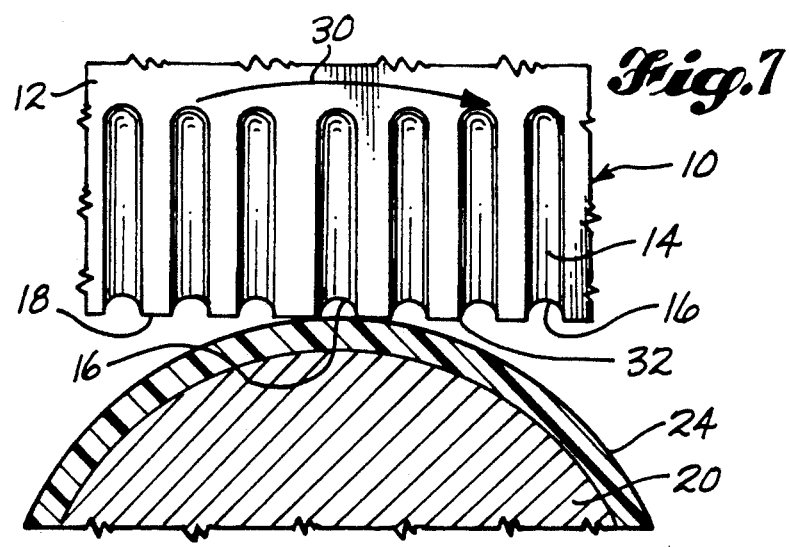
FIG. 7 is a view like FIG. 6, but shows another type of wire, and illustrates how a chipping point on the blade chips through a layer of hard insulation.

Referring now to the drawings, and first to FIG. 1, therein is shown generally at 10 a pair of blades constructed in accordance with a preferred embodiment of the invention. The blades are depicted on opposite sides of a wire 11 which is about to be stripped. It is to be understood that the bodies of the blades 10, which are not fully shown in the drawings, are shaped so that they can be used in conjunction with the rotary wire stripper disclosed in U.S. Pat. No. 4,745,828. Accordingly, the disclosure of that patent is incorporated herein by reference.

Briefly, and referring to FIGS. 5a and 5b of the '828 patent, the blades 10 disclosed here would normally be positioned inside diametrically-opposed wire guides of the '828 stripper (these are indicated at 9' in FIGS. 5a and 5b, and the general shape of each blade's body is indicated at 8'). Alternatively, they would be positioned in guides of the type disclosed in my co-pending application Serial No. 07/441,178. However, the bevel 12 of each blade shown here would preferably be reversed from the position shown in FIGS. 5a and 5b of the '828 patent. The reason for making this change is explained in my co-pending application, but it is not particularly germane to the concepts disclosed here.

Referring now to FIG. 2, a plurality of grooves 14a, 14b, 14c are scribed into beveled surface 12, or may be otherwise formed in the surface 12 by conventionally-known methods when the blades are initially manufactured. This creates notches 16a, 16b, 16c in the blade's edge 18. As the skilled person would know, scribing is accomplished by using a sharply pointed tool, such as a diamond-tipped tool, for example. The width or diameter of the tool's tip determines the width or distance across notches 16a, 16b, 16c.

The notches 16a, 16b, 16c are juxtapositionally interconnected by sharp sections or portions 18a, 18b, 18c of the blade's edge 18. For the sake of simplicity, when blade grooves, notches or sharp sections are hereafter mentioned in the context of the other Figs., they will generally be referred to by reference numerals 14, 16, and 18, respectively, without including alphabet sub-designations.

Referring now to FIG. 6, the blade 10 is shown cutting through the insulation surrounding the wire 11, in a manner that will be further described below. As per the description set forth above, the FIG. 6 wire is an example of a wire having a center conductor 20 surrounded by an inner layer of hard insulation 21, an intermediate layer of soft insulation 22, and an outer layer of hard insulation 24. By way of example, the hard insulation 21, 24 could be Kapton (trademark of the E. I. DuPont Company) or fiberglass.

Another type of wire 11 which the blade 10 is particularly well suited for cutting is the type shown in FIGS. 7-10. Once again, the way the blade 10 cuts through this wire's insulation 24 will be further described below. Briefly, the wire 11 of FIGS. 7-10 has a single center conductor 20 surrounded by a very thin layer 24 of hard insulation. In order to strip this type of wire, the blade 10 must advance through the insulation 24 under very controlled conditions, to avoid nicking the center conductor.

Figure 9:
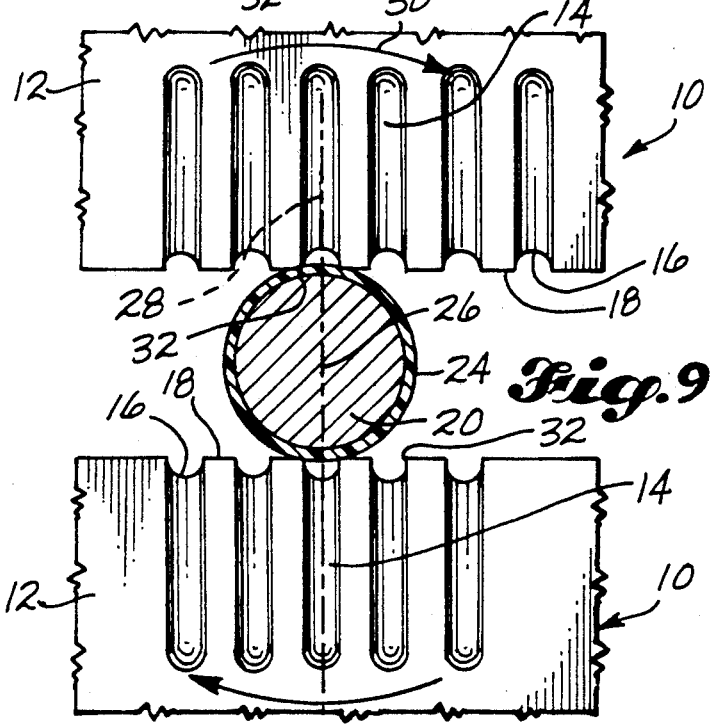
FIG. 9 is a view like FIG. 7.
Figure 10:
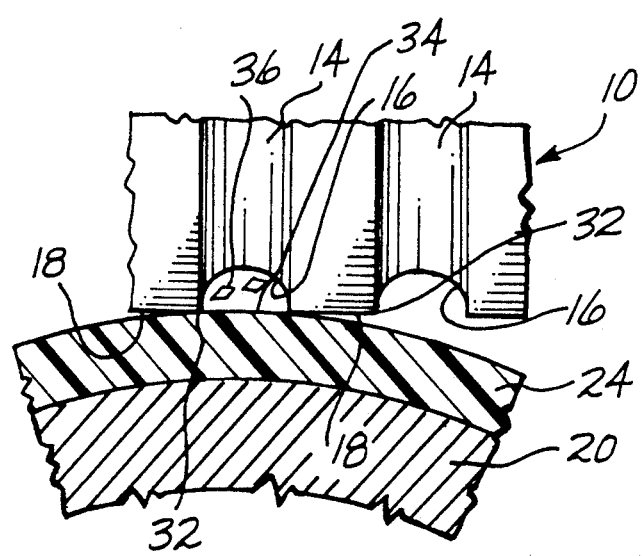
FIG. 10 is an enlarged fragmentary view of a portion of FIG. 7, and shows the chipping action the blade has on hard insulation.

Referring now to FIG. 10, which is an enlarged, fragmentary view of FIG. 7, a sharp section 18 of the blade's edge, which is rearward of notch 16 relative to the direction of blade travel (such direction being indicated by arrow 30 in FIGS. 7 and 9), defines a corner 32 on that side of the notch. This corner 32 chips away at the insulation 24 protruding slightly into the notch, which is indicated at 34, as the blade 10 advances. The chips are indicated at 36.

Other notches 16 in the blade's edge may also have a chipping function, depending on the outer diameter of the wire which is to be stripped. For those kinds of wires having soft insulation, the chipping function of blade corners 32 becomes unimportant. Instead, the sharp sections 18 of the blade cut through the insulation, similar to the operation of conventional blade designs. Thus, a single blade 10 is well suited for cutting both types of insulation which, on some wire types, occur in combination.

For example, referring once again to the FIG. 6 wire, the hard, outer layer of insulation 24 on the wire 11 shown there is first chipped through by blade corners 32 as the blades 10 advance radially inwardly. The chipping occurs in the same way as illustrated in FIG. 10. In other words, as the blades 10 advance, they gradually chip around and through the hard insulation, in the manner shown at 38 in FIG. 8, although it is to be understood that the wire 11 of FIG. 8 is a different type of wire.

After the outer layer 24 of the FIG. 6 wire is chipped through, the sharp sections 18 of the blades 10 slice through the soft layer 22 in a conventional manner as the blades advance further. However, upon encountering the inner, hard layer of insulation 21, the blades' chipping corners 32 again come into play and permit the blades to chip through to the center conductor 20, in a controlled fashion without accumulating an untoward amount of pressure on the insulation 21 or the center conductor.

Figure 8:
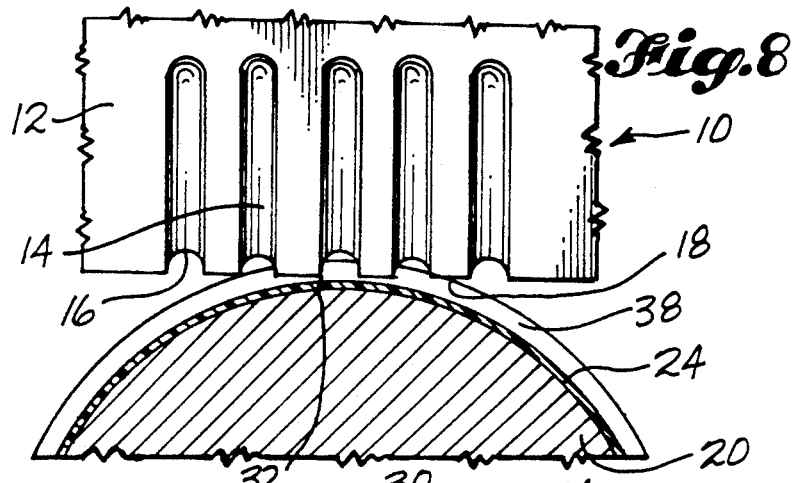
FIG. 8 is a view like FIG. 7, but shows a portion of the insulation cut or chipped away.

The chipping action is exactly the same for the wire shown in FIGS. 7-9. There, however, the sharp sections 18 of the blade's edge do not come into play as the wire has only a single layer of hard insulation 24.

It is to be understood that the various Figs. depict the wire's center conductor 20 to be a single strand. As mentioned above, the center conductor may in actuality consist of a plurality of twisted strands. The cutting blade 10 disclosed here works exactly the same in either case If a single notch is employed in the blade 10, then it should be centered with respect to the centerline axis 26 of the wire 11. Dashed line 28 in FIG. 9 illustrates this relationship. Preferably, however, each blade 10 has a large number of notches to accommodate a wide variety of wire diameters.

Having presented the above description, it is to be understood the improved blade disclosed herein could be modified in many ways without departing from the overall spirit and scope of what is considered to be the invention. For example, referring to FIGS. 4 and 5, there it is shown that notches may be placed in the blade's edge by scribing grooves on either the beveled 12 or nonbeveled 33 side of the blade.

Also, the number of notches placed in the blade's edge may vary at the user's choice, depending on the sizes of the wire to be stripped and/or the nature of the insulation to be cut through. The minimum size of the notch is preferably always based on the range of diameters of the wire to be stripped.

Thus, it is to be understood that the invention is not to be limited by the preceding description. Instead, it is to be limited only by the subjoined patent claim or claims which follow, wherein such claims are to be interpreted in accordance with the established doctrines of patent claim interpretation as set forth in the relevant statutes and court decisions.

What is claimed is:

1. In a mechanized rotary wire stripper characterized in that, when in operation, the stripper has at least one pair of diametrically opposed blades driven by a motor in a manner so that their cutting edges repetitively circle about the end of an insulated wire to be stripped, and simultaneously move in a symmetrical, generally radially inward fashion until their cutting edges contact and cut around the wire's insulation, to permit stripping the same from the wire's center conductor, an improved blade for use in connection with said stripper, said improved blade being adapted for cutting through both soft and hard forms of insulation, comprising:

a blade having a cutting edge, with at least a portion of said edge having at least one chipping point, said chipping point being defined by a substantially unsharpened notch in said cutting edge, said notch being positioned adjacent a sharpened, straight section of said edge, in a manner so that said sharpened section and said notch define a corner at one side of said notch shaped to chip through said insulation, the distance across said notch being substantially less than the outer diameter of the center conductor of said wire to be stripped, but sufficiently great so that at least a portion of the curvature of said insulation surrounding said center conductor is normally received within said notch during stripping of said wire, so that said corner chips through said insulation as said edge moves radially inward into contact with and circles said wire.

2. The improvement of claim 1, wherein said blade's cutting edge includes a plurality of substantially unsharpened notches distributed along said cutting edge, and a plurality of sharpened straight sections jutapositionally interconnecting said notches.

3. The improvement of claim 1, wherein said notch is positioned so that it is generally in centered relationship with respect to the wire's center conductor as the wire's insulation is cut.

4. The blade set forth in claim 1, wherein said notch is formed by scribing a groove in said blade in a direction perpendicular to said sharpened edge.

* * * * *